Nov. 17, 1959     C. W. JACKMAN     2,913,290
JOURNAL SHAFT BEARING
Filed Aug. 28, 1957
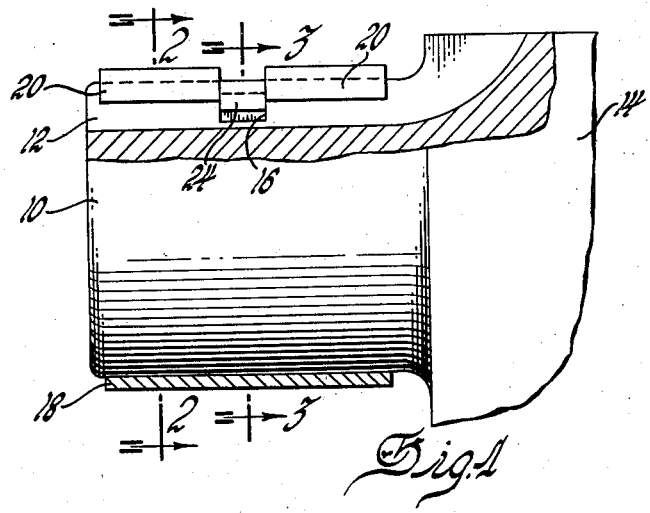
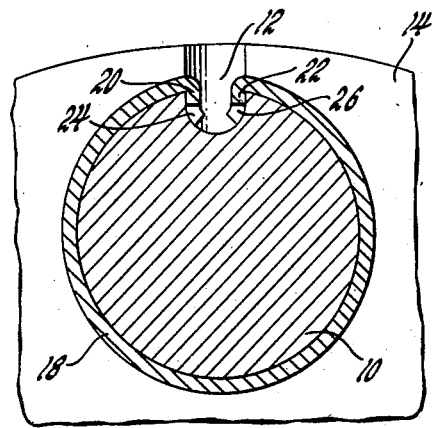
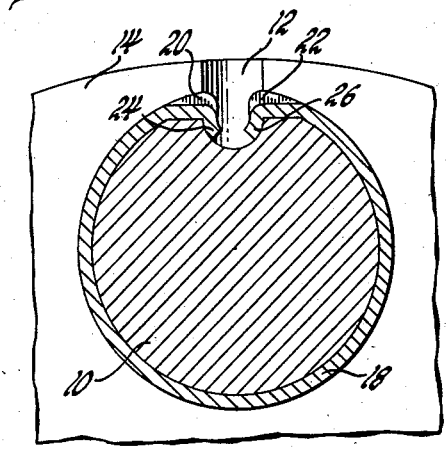
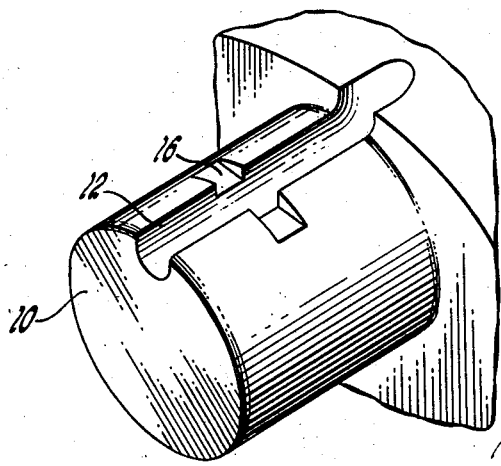
INVENTOR.
Charles W. Jackman
BY R. F. Barnard
ATTORNEY

United States Patent Office 2,913,290
Patented Nov. 17, 1959

2,913,290

JOURNAL SHAFT BEARING

Charles W. Jackman, Detroit, Mich., assignor to General Motors Corporation, Detroit, Mich., a corporation of Delaware Application August 28, 1957, Serial No. 680,754

3 Claims. (Cl. 308—237)

The present invention relates to a journal shaft bearing construction and more particularly one in which a relatively thin sleeve of wear resistant material is uniquely mounted on a shaft.

In the present journal bearing construction the wear sleeve is uniquely mounted on the shaft in such a way as to eliminate the undesirable relative axial movement between the sleeve and shaft as has frequently occurred in the past. Further, the present bearing construction is such that frictional forces acting circumferentially on the wear sleeve may be accommodated in a way to prevent seizure between the wear sleeve and the relatively rotating part adapted to be supported thereupon.

While the present journal bearing construction has broader applicability, it was developed to solve a problem which had arisen in a planetary gear construction. In a planetary gear set it is common to provide a pinion shaft upon which is mounted a planetary pinion gear. In the past it has been the practice to press wear resistant bushing into the bore of the planet pinion and to mount the latter on a pinion shaft which was normally of hardened and polished steel. Such pinions were inevitably relatively thin in the portion between the roots of the teeth and the central bore. Accordingly, when operating under heavy load the bore of the pinion was distorted into an oval form. The direction of such bore distortion or flexure remains in a generally fixed relation to the supporting shaft as the pinion rotates which induces a shearing or slipping action between the bushing and the bore of the pinion. This slipping action, though very slight with each revolution of the pinion, causes the bushing to creep slowly in the direction opposite to the direction of rotation of the pinion. This creeping of the bushing in rotating often combines with a longitudinal motion causing the bushing to creep out of one end of the pinion with resulting severe damage.

It is the purpose of the present invention to avoid the creeping or movement of a wear resistant bushing or sleeve relative to its supporting member. More particularly, in the present device, such a wear resistant sleeve is mounted on a stationary or journal shaft in a manner uniquely intended to prevent such bushing from moving axially away from its supporting shaft.

It is a further object of the present invention to provide a unique journal bearing construction in which the bearing sleeve is locked to the journal shaft in a way to prevent longitudinal movement between the sleeve and the shaft and which locking means will permit a limited amount of circumferential movement between the sleeve and shaft in order to prevent seizure between the bearing sleeve and the relatively rotating member adapted to be supported thereon.

Other objects and advantages of the present invention will be apparent from a perusal of the detailed description which follows.

In the drawings:

Figure 1 is a partially sectional elevational view of the subject journal construction;

Figure 2 is a view along line 2—2 of Figure 1;

Figure 3 is a view along line 3—3 of Figure 1; and

Figure 4 is a perspective view of the journal shaft construction.

A journal shaft is shown generally at 10 and is normally adapted to rotatably support a gear, or the like, thereon but which rotative member has not been shown since it is unnecessary to an understanding of the invention. Journal shaft 10 includes a longitudinally extending groove 12 formed in the periphery thereof. As best seen in Figures 2 through 4, longitudinal groove 12 extends throughout the length of the journal shaft 10 and even includes a portion extending within the shaft supporting member 14. Also formed in the surface of shaft 10 is a circumferential groove section 16. As seen in Figure 4, groove section 16 intersects longitudinal groove 12 and is generally normal thereto. Circumferential groove section 16 intersects the longitudinal groove section 12 essentially midway between the end thereof.

As seen in Figures 1 through 3, a split bearing sleeve 18 is adapted to be mounted on the journal shaft. The split sleeve 18 may be made of any suitable wear resistant material. Either before or after mounting on the journal shaft 10, the adjacent ends of the split bearing sleeve 18 are bent to provide tabs 20 and 22 which when the sleeve is mounted on the shaft will in general prevent relative rotation therebetween. Mounting the split bearing or wear sleeve 18 upon the shaft 10 and thereafter bending the tabs 20 and 22 within the groove 12 will provide a relatively easy method of mounting the sleeve and yet one which will insure a tight fit between the sleeve and the subadjacent shaft.

The depth of the groove 12 will be sufficiently great that the tabs 20 and 22 will not terminate adjacent the bottom thereof. In this way it is assured that sleeve 18 may be tightly wrapped about shaft 10 without causing the sleeve to buckle or bulge as would be likely to occur if the tabs bottomed within the groove 12 and particularly if such tabs engaged each other therewithin.

When such a bearing is subjected to particularly heavy radial loads, the circumferential friction forces acting on the wear sleeve 18 are likely to cause or tend to cause relative circumferential movement of the sleeve relative to the shaft. Accordingly, the width of longitudinal groove 12 is made sufficiently large to accommodate any such potential movement. In this way the circumferential frictional forces tending to distend or stretch the sleeve 18 will cause it to wrap more tightly around the shaft 10 with any circumferential sleeve excess expanding within the width of groove 12. Accordingly, sleeve 18 is prevented from bunching and hence seizing against the corresponding surface of the rotating member adapted to be mounted thereupon.

After the tabs 20 and 22 have been formed and the sleeve 18 mounted on the shaft 10, additional tabs 24 and 26 are struck from the sleeve and depressed within the circumferential groove section 16. Thus tabs 24 and 26 lock the sleeve to the shaft to prevent relative longitudinal movement therebetween. The width of the tabs 24 and 26 will be sufficiently great to withstand the shear forces likely to be imposed thereon. Further, and in contrast to the relationship between the longitudinal groove 12 and tabs 20 and 22, the width of tabs 24 and 26 and groove 16 will be substantially equal since it is unnecessary and undesirable to provide for any relative longitudinal or axial movement between the sleeve and shaft.

While only one such is shown, a plurality of circumferential groove sections 16 may be provided if such would be desired for better load distribution.

Further, it is to be understood that various structural modifications may be made in the subject invention, the scope of which is set forth in the hereinafter appended claims.

I claim:

1. A journal bearing comprising a shaft, a longitudinally extending groove formed in the periphery of said shaft, a circumferential groove section formed in said shaft and intersecting said longitudinal groove substantially midway of the latter's length, a split sleeve substantially surrounding said shaft, said sleeve including a first set of tabs projecting within said longitudinal groove to substantially retain said sleeve upon said shaft against relative circumferential movement, and a second set of tabs projecting within said circumferential groove section to retain said sleeve against relative longitudinal movement with respect to the subadjacent shaft, the width of the longitudinal groove being such as to provide a gap between the tab means cooperating therewith to permit circumferential expansion of the sleeve within the groove.

2. A journal bearing as set forth in claim 1 in which both sets of tabs terminate short of the bottom of the longitudinal groove.

3. A journal bearing as set forth in claim 1 in which the widths of said second set of tabs and said circumferential groove are substantially coextensive, and said tabs terminate short of the bottom of said longitudinal groove.

References Cited in the file of this patent

UNITED STATES PATENTS

| 1,872,600 | Manning | Aug. 16, 1932 |
| 2,170,545 | Burton | Aug. 22, 1939 |
| 2,481,025 | Koch | Sept. 6, 1949 |

FOREIGN PATENTS

| 384,394 | Great Britain | Dec. 8, 1932 |